US012779338B2

(12) United States Patent
Gould et al.

(10) Patent No.: US 12,779,338 B2
(45) Date of Patent: Nov. 3, 2026

(54) CROSS-PLATFORM PLAY WITH REAL-TIME AUGMENTATION FOR MAINTAINING AN EVEN PLAYING FIELD BETWEEN PLAYERS

(71) Applicants: Sony Interactive Entertainment Inc., Tokyo (JP); Sony Interactive Entertainment LLC, San Mateo, CA (US)

(72) Inventors: Lee Kirsten Gould, San Mateo, CA (US); Elizabeth Juenger, San Mateo, CA (US)

(73) Assignees: Sony Interactive Entertainment Inc., Tokyo (JP); Sony Interactive Entertainment LLC, San Mateo, CA (US)

( * ) Notice: Subject to any disclaimer, the term of this patent is extended or adjusted under 35 U.S.C. 154(b) by 422 days.

(21) Appl. No.: 18/486,125

(22) Filed: Oct. 12, 2023

(65) Prior Publication Data

US 2025/0121290 A1 Apr. 17, 2025

(51) Int. Cl.
*A63F 13/70* (2014.01)
*A63F 13/23* (2014.01)
(Continued)

(52) U.S. Cl.
CPC .............. *A63F 13/67* (2014.09); *A63F 13/23* (2014.09); *A63F 13/798* (2014.09)

(58) Field of Classification Search
None
See application file for complete search history.

(56) References Cited

U.S. PATENT DOCUMENTS 8,221,221 B2 * 7/2012 Riego .................... A63F 13/45 463/16
2004/0002369 A1 * 1/2004 Walker .................... A63F 13/46 463/1

(Continued)

FOREIGN PATENT DOCUMENTS

KR 20200046842 A * 5/2020 ............ A63F 13/45
WO WO-2020213301 A1 * 10/2020 ............ G06V 40/19

OTHER PUBLICATIONS

PCT/US2024/049628, "International Search Report and Written Opinion", Jan. 8, 2025, 12 pages.

*Primary Examiner* — Tramar Harper
(74) *Attorney, Agent, or Firm* — Kilpatrick Townsend & Stockton LLP

(57) ABSTRACT

A method includes monitoring in a gaming session game play of a first player playing a game on a device of a first platform, and monitoring game play of a second player playing the game on a device of a second platform. A first valuation of a performance metric measuring gaming effectiveness is determined for the game play by the first player. A second valuation of the performance metric is determined for the game play by the second player. A difference between the first valuation and the second valuation does not satisfy a threshold band of operation that is based on global skill levels of the first and second players. The game play of the first player is augmented to modify the first valuation so that the threshold band of operation is satisfied in order to normalize effectiveness of playing the video game between the first and second players.

20 Claims, 6 Drawing Sheets

100

(51) Int. Cl.
*A63F 13/67* (2014.01)
*A63F 13/798* (2014.01)

(56) References Cited

U.S. PATENT DOCUMENTS

| | | | | |
|---|---|---|---|---|
| 2008/0242421 | A1* | 10/2008 | Geisner | A63F 13/75 463/42 |
| 2008/0268943 | A1* | 10/2008 | Jacob | A63F 13/10 463/43 |
| 2014/0274258 | A1* | 9/2014 | Hartmann | G07F 17/3241 463/13 |
| 2015/0265926 | A1* | 9/2015 | Jacob | A63F 13/10 463/23 |
| 2016/0243445 | A1 | 8/2016 | Lovitt | |
| 2018/0243656 | A1* | 8/2018 | Aghdaie | A63F 13/67 |
| 2019/0091577 | A1 | 3/2019 | Reiche et al. | |
| 2019/0091582 | A1* | 3/2019 | Reiche, III | A63F 13/25 |
| 2019/0388789 | A1* | 12/2019 | Aghdaie | G06Q 10/04 |
| 2021/0038998 | A1* | 2/2021 | Tallarico | A63F 13/214 |

* cited by examiner

CROSS-PLATFORM PLAY WITH REAL-TIME AUGMENTATION FOR MAINTAINING AN EVEN PLAYING FIELD BETWEEN PLAYERS

TECHNICAL FIELD

The present disclosure is related to normalizing effectiveness of playing a video game between players using different platform devices to reduce technical disadvantages and/or advantages of one player over another player. In that manner, the gaming experience of each of the players is normalized as if each of the players are using devices of the same platform.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop computers, laptop computers, mobile phones, tablet computers, etc. When players are playing a video game in a multi-player mode, players playing on devices of one platform may have an advantage or disadvantage when interacting with the video game over players playing on devices of another platform. For example, one player may realize a technical advantage or disadvantage over another player just by playing on a different platform. Also, the technical advantage or disadvantage may be realized by one team of players over another team of players, where players of both teams may be using devices of different platforms.

For instance, a video game may be designed to be played on a gaming console platform. When a player plays the video game using the gaming console, the interactions of the player with the gaming console for generating and displaying the game play is most ideal. On the other hand, when another player plays the video game using a device of a platform that is not a gaming console (e.g., mobile phone), interactions with that device may be compromised in order to provide for gaming of that video game on that device. That is, the interactions of the player using a mobile phone may be less than ideal. For example, an input control tied to a command (e.g., accelerate an object) to be executed by the video game may include pushing a toggle forward on a hand held controller of the gaming console, but may be mapped to repeated swipes on a display of a mobile phone to achieve the same result. As such, the player using the mobile phone may be required to perform multiple swiping actions, each of which is more difficult to perform (i.e., holding the phone with one hand and repeatedly swiping the screen with the other hand) when compared to just pushing a toggle forward when using the gaming console (e.g., holding the controller with both hands and using a finger to push the toggle forward). This introduces a technical disadvantage for the player using the mobile phone to perform the command when compared to the player playing on a gaming console that just needs to push the toggle forward to perform the same command. Conversely, the player using the gaming console would have a technical advantage over the player using the mobile phone. As a result, the game play of the player using the mobile phone may suffer when playing against the player using the gaming console. That is, the playing field between the players is unequal because the players are using devices of different platforms to interact with the video game for their respective game plays. As an illustration, an equal playing field would be achieved when both players are using devices of the same platform, such as both players are using a gaming console, or both players are using a mobile phone.

It is in this context that embodiments of the disclosure arise.

SUMMARY

Embodiments of the present disclosure relate to providing cross-platform augmentation and/or assistance to one or more players playing a video game on devices of different platforms in a gaming session. The effectiveness of playing a game by a player may be dependent on which platform that player is using. That is, the effectiveness of one player in playing the video game may be different when playing on devices of different platforms. As such, this would influence the relative difference between effectiveness in game plays for two or more players depending on which devices and their respective platforms are used. When the relative difference between effectiveness in game plays for two or more players is outside a threshold band of operation, which is reflective of global skill levels (platform agnostic) of each of the players, augmentation and/or assistance is provided in one or both of the game play environments on respective platforms. In that manner, an even playing field between the players playing on devices of different platforms may be achieved.

In one embodiment, a method is disclosed. The method including monitoring a first game play of a first player playing a video game on a first device of a first platform in a gaming session. The method including monitoring a second game play of a second player playing the video game on a second device of a second platform in a gaming session. The method including determining a first valuation of a performance metric for the first game play by the first player, wherein the performance metric is configured to measure gaming effectiveness when playing the video game. The method including determining a second valuation of the performance metric for the second game play by the second player. The method including determining that a difference between the first valuation and the second valuation does not satisfy a threshold band of operation for the metric that is based on a first global skill level of the first player and a second global skill level of the second player. The method including augmenting the first game play of the first player to modify the first valuation of the performance metric so that the difference between the first valuation that is modified and the second values satisfies the threshold band of operation. Satisfying the threshold band of operation normalizes effectiveness of playing the video game between the first player and the second player.

In another embodiment, a non-transitory computer-readable medium storing a computer program for implementing a method is disclosed. The computer-readable medium including program instructions for monitoring a first game play of a first player playing a video game on a first device of a first platform in a gaming session. The computer-readable medium including program instructions for monitoring a second game play of a second player playing the video game on a second device of a second platform in a gaming session. The computer-readable medium including program instructions for determining a first valuation of a performance metric for the first game play by the first player, wherein the performance metric is configured to measure gaming effectiveness when playing the video game. The computer-readable medium including program instructions for determining a second valuation of the performance metric for the second game play by the second player. The computer-readable medium including program instructions for determining that a difference between the first valuation and the second valuation does not satisfy a threshold band of operation for the metric that is based on a first global skill level of the first player and a second global skill level of the second player. The computer-readable medium including program instructions for augmenting the first game play of the first player to modify the first valuation of the performance metric so that the difference between the first valuation that is modified and the second values satisfies the threshold band of operation. Satisfying the threshold band of operation normalizes effectiveness of playing the video game between the first player and the second player.

In still another embodiment, a computer system is disclosed, wherein the computer system includes a processor and memory coupled to the processor and having stored therein instructions that, if executed by the computer system, cause the computer system to execute a method. The method including monitoring a first game play of a first player playing a video game on a first device of a first platform in a gaming session. The method including monitoring a second game play of a second player playing the video game on a second device of a second platform in a gaming session. The method including determining a first valuation of a performance metric for the first game play by the first player, wherein the performance metric is configured to measure gaming effectiveness when playing the video game. The method including determining a second valuation of the performance metric for the second game play by the second player. The method including determining that a difference between the first valuation and the second valuation does not satisfy a threshold band of operation for the metric that is based on a first global skill level of the first player and a second global skill level of the second player. The method including augmenting the first game play of the first player to modify the first valuation of the performance metric so that the difference between the first valuation that is modified and the second values satisfies the threshold band of operation. Satisfying the threshold band of operation normalizes effectiveness of playing the video game between the first player and the second player.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
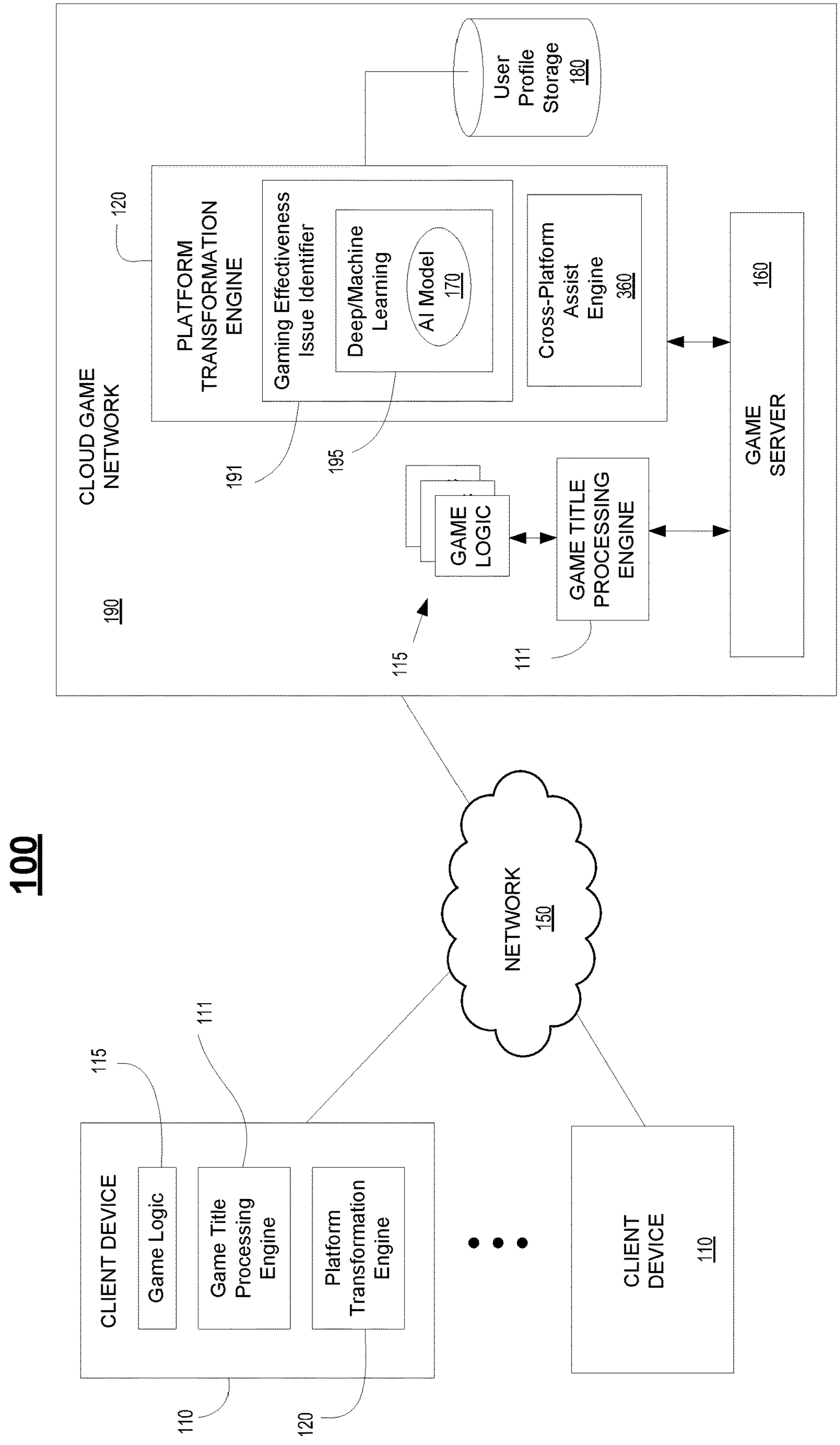
FIG. 1 illustrates a system configured for providing cross-platform augmentation and/or assistance in the game plays of one or more players playing a video game in order to reduce the effects of playing the video game on different platform devices by different players, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure are set forth without any loss of generality to, and without imposing limitations upon, the claims that follow this description.

Generally speaking, the various embodiments of the present disclosure describe systems and methods for providing cross-platform augmentation and/or assistance in the game plays of one or more players playing a video game in order to reduce the effects of playing the video game on different platform devices by different players. In that manner, an even playing field is achieved between players playing a video game for and against each other when the players may be playing on devices of different platforms. For example, a system providing adaptive cross-platform augmentation and/or assistance would use various sensors and information sources to detect the various platforms being used by the players, such as the type of device, screen size, input method, etc. This platform information can be used to determine the differences between the two players' gaming environments. Based on the detected differences, the system can provide augmentations to one or more game play environments. For example, if one player is using a gaming console with a larger screen with better graphics and a controller optimized to communicate input controls for execution of the video game, while the other player is using a mobile device with a smaller screen and poorer graphics and a user interface that has been mapped and/or converted to communicate the same input controls, the system could limit certain features on the gaming console and/or further provide shortcuts or other assistance to the mobile player to make the game play fairer and more accessible to the mobile player. In some embodiments, the system can provide dynamic tools that adapt to the specific needs and capabilities of each platform. For example, if one platform supports certain types of input, such as motion controls or touch screens, while the other doesn't, the system could provide alternative input methods or adjust the gameplay mechanics to better suit each platform. In still other embodiments, the system could dynamically remove certain features from one player's gaming environment to level the playing field or ensure a consistent experience across different platforms. For instance, if one platform doesn't support a certain type of visual effect or physics simulation, the system could remove it from both players' gaming environments to ensure fairness and consistency between the players. Conversely, the system could provide additional functions or enhancements to a platform that is limited in some way. For example, if one platform doesn't support voice chat or multiplayer modes, the system could provide alternative communication methods or single-player modes that offer similar gameplay experiences.

Advantages of the methods and systems configured to provide cross-platform augmentation and/or assistance in the game plays of one or more players playing a video game on devices of different platforms include the ability to dynamically promote level playing fields for players participating in a gaming session of a video game. In particular, a technical solution is implemented to reduce and/or remove advantages or disadvantages experienced in a game play of a video game created through cross platform play by players in a gaming session. That is, cross-platform augmentation and/or assistance in the game plays of one or more players is implemented to reduce the effects of playing the video game on different platform devices. In that manner, an even playing field is achieved between players playing a video game for and against each other when the players may be playing on devices of different platforms. Another advantage includes providing a technical solution to address accessibility issues for players with disabilities. For example, detection of disadvantages for a player with disabilities allows for the augmentation and/or assistance in the game play of that player to reduce the effect of those disadvantages. Still another advantage includes a technical solution to address the inability to compete with gaming bots using artificial intelligence to play a video game in a multi-player gaming session against human players. For example, detection of a game bot allows for the augmentation and/or assistance in the game play of a human player and/or the game bot to promote a level playing field between the game bot and the one or more human players.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Furthermore, the term "platform" refers to a combination of hardware and software components providing a set of capabilities in order to execute one or more software applications (e.g., video games). For example, the term "platform" may be used with reference to "devices of a particular platform" or "cross-platform devices." Moreover, suitable terms introduced above are interchangeable.

With the above general understanding of the various embodiments, example details of the embodiments will now be described with reference to the various drawings.

FIG. 1 illustrates a system configured for providing cross-platform augmentation and/or assistance in the game plays of one or more players playing a video game in order to reduce the effects of playing the video game on different platform devices by different players, in accordance with one embodiment of the present disclosure. In that manner, an even playing field is achieved between players playing a video game (e.g., when they are playing for and against each other) when the players may be playing on devices of different platforms.

As shown, system 100 may provide gaming over a network 150 for one or more client devices 110. In particular, system 100 may be configured to enable users to interact with interaction applications, including provide gaming to users participating in a single-player or multi-player gaming sessions (e.g., participating in a video game in single-player or multi-player mode, or participating in a metaverse generated by an application with other users, etc.) via a cloud game network 190, wherein the game can be executed locally (e.g., on a local client device of a corresponding user) or can be executed remotely from a corresponding client device 110 (e.g., acting as a thin client) of a corresponding user that is playing the video game, in accordance with one embodiment of the present disclosure. In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between user, etc., so that the users in distributed locations participating in a multi-player gaming session can interact with each other in the gaming world or metaverse in real-time. In another capacity, the cloud game network 190 supports multiple users participating in a metaverse.

In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the internet.

In a multi-player session allowing participation for a group of users to interact within a gaming world or metaverse generated by an application (which may be a video game), some users may be executing an instance of the application locally on a client device (e.g., gaming console, tablet, mobile phone, etc.) to participate in the multi-player session. Other users who do not have the application installed on a selected device or when the selected device is not computationally powerful enough to executing the application may be participating in the multi-player session via a cloud based instance of the application executing at the cloud game network 190.

As shown, the cloud game network 190 includes a game server 160 that provides access to a plurality of video games. Most applications played in a corresponding multi-player session are played over the network 150 with connection to the game server 160. For example, in a multi-player session involving multiple instances of an application (e.g., generating virtual environment, gaming world, metaverse, etc.), a dedicated server application (session manager) collects data from users and distributes it to other users so that all instances are updated as to objects, characters, etc. to allow for real-time interaction within the virtual environment of the multi-player session, wherein the users may be executing local instances or cloud based instances of the corresponding application. In particular, game server 160 may manage a virtual machine supporting a game processor that instantiates a cloud based instance of an application for a user. As such, a plurality of game processors of game server 160 associated with a plurality of virtual machines is configured to execute multiple instances of one or more applications associated with gameplays of a plurality of users. In that manner, back-end server support provides streaming of media (e.g., video, audio, etc.) of gameplays of a plurality of applications (e.g., video games, gaming applications, etc.) to a plurality of corresponding users. That is, game server 160 is configured to stream data (e.g., rendered images and/or frames of a corresponding gameplay) back to a corresponding client device 110 through network 150. As such, a computationally complex gaming application may be executing at the back-end server in response to controller inputs received and forwarded by client device 110. Each server is able to render images and/or frames that are then encoded (e.g., compressed) and streamed to the corresponding client device for display.

In addition, the cloud game network 190 includes storage 180 configured for storing user profiles of one or more players. For example, the user profiles include information related to each of the players, such as identifying information, games played, game currently playing, player skill level, global skill level, etc. In particular, a global skill level may describe a player's general gaming ability across a variety of games made with reference to other players in the gaming universe. That is, the global skill level measures overall skill of the player playing one or more video games. In some implementations, the global skill level may refer to a specific video game. For example, a global skill level may include a ladder ranking or player ranking.

In the multi-player session, instances of an application may be executing locally on a client device 110 or at the cloud game network 190. In either case, the application as game logic 115 is executed by a game engine 111 (e.g., game title processing engine). For purposes of clarity and brevity, the implementation of game logic 115 and game engine 111 is described within the context of the cloud game network 190. In particular, the application may be executed by a distributed game title processing engine (referenced herein as "game engine"). In particular, game server 160 and/or the game title processing engine 111 includes basic processor based functions for executing the application and services associated with the application. For example, processor based functions include 2D or 3D rendering, physics, physics simulation, scripting, audio, animation, graphics processing, lighting, shading, rasterization, ray tracing, shadowing, culling, transformation, artificial intelligence, etc. In that manner, the game engines implement game logic, perform game calculations, physics, geometry transformations, rendering, lighting, shading, audio, as well as additional in-game or game-related services. In addition, services for the application include memory management, multi-thread management, quality of service (QoS), bandwidth testing, social networking, management of social friends, communication with social networks of friends, social utilities, communication channels, audio communication, texting, messaging, instant messaging, chat support, game play replay functions, help functions, etc.

In one embodiment, the cloud game network 190 may support artificial intelligence (AI) based services including chatbot services (e.g., ChatGPT, etc.) that provide for one or more features, such as conversational communications, composition of written materiel, composition of music, answering questions, simulating a chat room, playing games, and others.

Users access the remote services with client devices 110, which include at least a CPU, a display and input/output (I/O). For example, users may access cloud game network 190 via communications network 150 using corresponding client devices 110 configured for providing input control, updating a session controller (e.g., delivering and/or receiving user game state data), receiving streaming media, etc. The client device 110 can be a personal computer (PC), a mobile phone, a personal digital assistant (PAD), handheld device, etc.

The client devices 110 may be operating using different platforms. For example, one or more client devices may be operating on a first platform (e.g., gaming consoles), and other client devices may be operating a different platform (mobile phones). In still another platform, a platform includes both a client device and game server 160 located at the cloud game network 190 in support of a cloud based instance of an application. As previously described, each platform may include a combination of hardware and software components providing a set of capabilities in order to execute one or more software applications (e.g., video games).

In particular, client device 110 of a corresponding user is configured for requesting access to applications over a communications network 150, such as the internet, and for rendering for display images generated by a video game executed by the game server 160, wherein encoded images are delivered (i.e., streamed) to the client device 110 for display. For example, the user may be interacting through client device 110 with an instance of an application executing on a game processor of game server 160 using input commands to drive a gameplay. Client device 110 may receive input from various types of input devices, such as game controllers, tablet computers, keyboards, touch screens, gestures captured by video cameras, mice, touch pads, audio input, etc.

As previously introduced, client device 110 may be configured with a game title processing engine and game logic 115 (e.g., executable code) that is locally stored for at least some local processing of an application, and may be further utilized for receiving streaming content as generated by the application executing at a server, or for other content provided by back-end server support.

In another embodiment, client device 110 may be configured as a thin client providing interfacing with a back end server (e.g., game server 160 of cloud game network 190) configured for providing computational functionality (e.g., including game title processing engine 111 executing game logic 115—i.e., executable code—implementing a corresponding application).

In addition, system 100 includes a platform transformation engine 120 configured to provide cross-platform augmentation and/or assistance to one or more players playing a video game on devices of different platforms in a gaming session in order to achieve an even playing field between the players. The platform transformation engine 120 includes a gaming effectiveness issue identifier 191 that is configured to classify and/or identify gaming effectiveness for each player and further identify one or more issues related to gaming effectiveness of the players. For example, an issue that is identified arises when relative differences in gaming effectiveness between players exceeds a threshold band of operation that is reflective of global skill levels of the players. In particular, when the threshold band of operation is exceeded, a player may experience a technical advantage or disadvantage, such as when a challenged player is given an unfair disadvantage over another player that is over and beyond what may be acceptable (as predefined) based on global skill levels of the players, or when an enhanced player is given an unfair advantage over another other player. The gaming effectiveness issue identifier 191 may also be configured to determine, identify, and/or classify information used for identifying gaming effectiveness and their related issues, such as, game context, player effectiveness in gaming, differences between player effectiveness in gaming, a threshold band of operation that is based on global skill levels of players, comparing player effectiveness to the threshold band of operation, and identifying an issue created when players use devices of different platforms when gaming effectiveness of players exceeds the threshold band of operation. The classification and/or identification of gaming effectiveness of players and one or more issues related to the gaming effectiveness of the players may be performed using artificial intelligence (AI) via an AI layer. For example, the AI layer may be implemented via an AI model 170 as executed by a deep/machine learning engine 195 of the gaming effectiveness issue identifier 191. It is understood that one or more AI models may be implemented, each of which being configured to perform customized classification and/or identification of data. The platform transformation engine 120 may be implemented at the back-end cloud game network, or as a middle layer third party service that is remote from the client device. In some implementations, the platform transformation engine 120 may be located at a client device 110.

The platform transformation engine 120 includes a cross-platform assist engine 360 that is configured to reduce technical advantages or disadvantages introduced with players using devices of different platforms that may be created when the relative difference between effectiveness in game plays for two or more players is outside a threshold band of operation. In particular, the cross-platform assist engine 360 is configured to provide cross-platform augmentation and/or assistance to one or more players in order to achieve a level playing field between the players.

Figure 2:
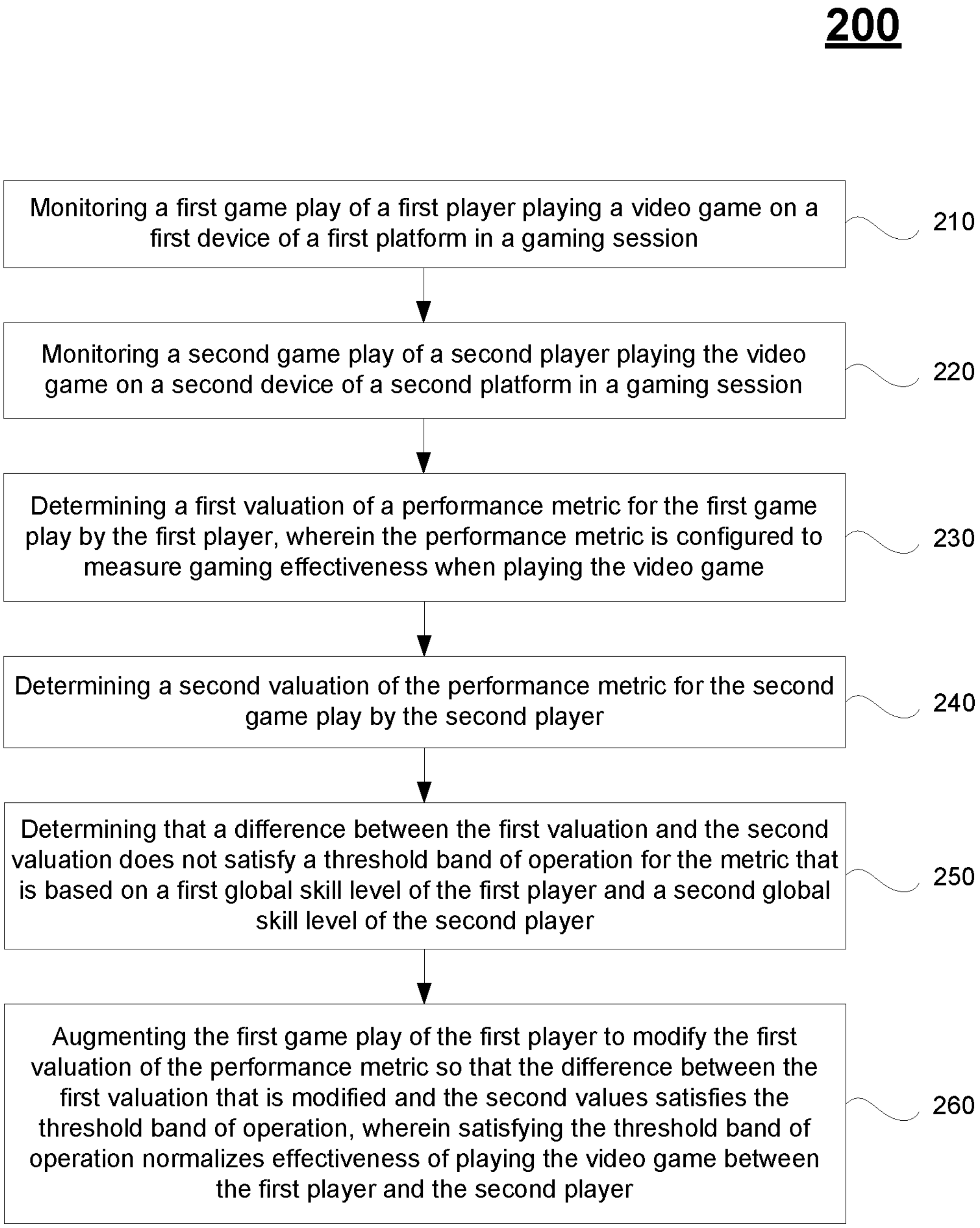
FIG. 2 is a flow diagram illustrating a method for providing cross-platform augmentation and/or assistance in the game plays of one or more players playing a video game in order to reduce the effects of playing the video game on different platform devices, in accordance with one embodiment of the present disclosure.

With the detailed description of the system 100 of FIG. 1, flow diagram 200 of FIG. 2 discloses a method for providing cross-platform augmentation and/or assistance in the game plays of one or more players playing a video game, such as to reduce the effects of playing the video game on different platform devices, in accordance with one embodiment of the present disclosure. In that manner, an even playing field is achieved between players that are playing against for or against each other, singly or in a team environment. The operations performed in the flow diagram may be implemented by one or more of the entities previously described components, and also system 100 described in FIG. 1, including platform transformation engine 120.

At 210, the method includes monitoring a first game play of a first player playing a video game on a first device of a first platform in a gaming session. At 220, the method includes monitoring a second game play of a second player playing the video game on a second device of a second platform in a gaming session. For example, various information related to a game play may be captured, including user data, user saved data, metadata, etc. User data may include user identifying information, skill level of the corresponding user, global skill level of the corresponding user, etc. User data may be accessed through a user profile of the corresponding user. User saved data is configured for personalizing a video game for the corresponding user (e.g., character information and/or attributes used to generate a personalized character. Metadata includes any relevant information captured and/or generated during the game play of the corresponding user, including user saved data, game state data, etc. For example, game state may be captured from the game play of the video game at one or more points in time, and is related to one or more states of the application during execution for a game play of a corresponding user. Game state data allows for the generation of a gaming environment at a corresponding point in the game play of a corresponding user. In addition, metadata may include the platform on which the corresponding user is playing a video game (e.g., gaming console, mobile phone, etc.).

At 230, the method includes determining a first valuation of a performance metric for the first game play by the first player. In particular, the performance metric is configured to measure gaming effectiveness of a corresponding player when playing a corresponding video game. For example, the first valuation measures effectiveness of the first player playing the video game in the first game play.

The effectiveness of playing a video game may be dependent on which platform is used to play the video game. That is, the first valuation may or may not be an accurate reflection of the actual ability (e.g., global skill level) of the player playing the video game. For example, the platform may introduce advantages or disadvantages to the game play, which would affect the gaming effectiveness of the player. In one instance, if the platform introduces one or more technical obstacles in playing the game (e.g., the user interface is not ideal for conveying commands, such as when using a mobile phone), then the gaming effectiveness of the player using that platform would suffer, such that the gaming effectiveness of the player would be lower than what it would normally be if the player was using a platform more suited of the video game (e.g., gaming console), or a platform typically used by the player. In another instance, if the platform introduces technical enhancements, then the gaming effectiveness of the player using that platform may improve, such that the gaming effectiveness of the player would be higher.

At 240, the method includes determining a second valuation of the performance metric for the second game play by the second player. As previously described, the performance metric is configured to measure gaming effectiveness of a corresponding player when playing a corresponding video game. As such, the second valuation measures effectiveness of the second player playing the video game in the second game play.

At 250, the method includes determining that a difference between the first valuation and the second valuation does not satisfy a threshold band of operation for the metric that is based on a first global skill level of the first player and a second global skill level of the second player. In particular, the difference between the first valuation and the second valuation indicates a relative difference between the gaming effectiveness of the players.

Although the first valuation and/or the second valuation in isolation may not be accurate reflections of the abilities of each of the first and second players, the relative difference between the first and second valuations may reflect whether one player is technically disadvantaged or advantaged over the other player over and beyond what may be selected as being acceptable (e.g., predefined), such as when none of the players experience an advantage or disadvantage (e.g., technical or otherwise). For example, the threshold band of operation may indicate what is acceptable, and is based on (e.g., a function of) the global skill levels of the players, wherein a global skill level of a player measures overall skill of the player playing one or more video games, and may include a player skill level that is determined, a ladder or player ranking, etc. In particular, the threshold band of operation may be defined as a function of a relative difference between the first global skill level of the first player and the second global skill level of the second player. For example, the function may be a multiplier (e.g., 1× the relative difference between global skill levels, 2×, etc.). The threshold band of operation relates the global skill levels of the players to the gaming effectiveness of the players, and more particularly defines what is acceptable between the relative differences in the gaming effectiveness of the players. As such, when the threshold band of operation is exceeded by the difference between the valuation and the second valuation, this may be an indication that a player experiences a technical advantage or disadvantage over the other player. This may occur when a technically challenged player is given an unfair disadvantage over the other player over and beyond what was acceptable based on global skill levels (i.e., the threshold band of operation), or when a technically enhanced player is given an unfair advantage.

Technical advantages and/or disadvantages may be introduced and/or created based on unequal abilities provided by the devices of different platforms being used by the first player and the second player. For example, one player may be advantaged or disadvantaged because there are differences in network quality of service (QoS) (e.g., metrics including frames per second or network speed, etc.), such as when the network bandwidth of one player is changing relative to the network bandwidth of the other player. In another example, one player may be advantaged or disadvantaged because there are differences in user interface design, wherein one user interface poorly communicates an underlying command using a corresponding input control (e.g., gesture), whereas another user interface is better suited for communicating the command (e.g., toggle forward on a hand-held controller). In still other example, one player may be advantaged or disadvantaged because there are differences in hardware resources between the platforms used. For example, one player may be using a smaller screen size (e.g., mobile phone) over another player using a display screen, or when a device of one player has lower processing power (e.g., CPU or GPU) than a device of the other player.

At 260, the method includes augmenting the first game play of the first player to modify the first valuation of the performance metric so that the difference between the first valuation that is modified and the second valuation satisfies the threshold band of operation. In other embodiments, one or more of the game plays of the first and/or second player is augmented and/or assisted so that the difference between the first valuation that is modified and the second valuation satisfies the threshold band of operation. In particular, by satisfying the threshold band of operation, the difference between gaming effectiveness of the players is normalized. That is, the relative difference between the first valuation that is modified and the second valuation measuring gaming effectiveness of the players more accurately reflects the difference between the global skill levels of the players (e.g., as indicated in the threshold band of operation). As such, by augmenting and/or assisting the game play of at least the first player, the relative difference between gaming effectiveness of playing the video game by the first and second players is normalized to more accurately reflect the relative differences between actual or global skill levels of the players. For example, the global skill levels are determined from a platform environment that is not affected by or minimizes the differences in platforms being used, such as by averaging out measured skill levels of a player when playing games across one or more platforms to determine a corresponding global skill level. In that manner, the game plays (as measured through corresponding gaming effectiveness) of the first and second players are influenced and brought within the threshold band of operation in order to achieve an even playing field by the players.

In embodiments, augmenting and/or assisting the one or more game plays of the players is dynamically applied, such that that actions performed are adaptive, variably applied, and on-going throughout the gaming session. Also, the augmenting and/or assisting is performed where and when needed to continually even the playing field between the players. In embodiments, the game plays of one or more players (e.g., the first and/or second player) can be augmented to bring their corresponding gaming effectiveness values within the threshold band of operation. More particularly, any combination of negative or positive augmentation and/or assistance may be applied to the game plays of the players. For example, the augmentation and/or assistance may make the video game easier or harder to play for a corresponding player. Further, the augmenting and/or assisting of the corresponding game play may be variably applied. For instance, the augmentation and/or assistance may be applied as per a degree, such as application between zero (0) and one-hundred (100) percent. Moreover, the augmentation and/or assistance is adaptive and/or tailored to the context of the gaming environment and/or gaming platform experienced by the players. Moreover, the augmentation and/or assistance is implemented in real time depending on whether or not the measured gaming effectiveness of the players meet the threshold band of operation. That is, the augmentation and/or assistance of the corresponding game play may be implemented or not implemented based on whether the threshold band of operation is satisfied. In that manner, application of the augmentation and/or assistance of the corresponding game play may be on-going and is dependent on satisfying the threshold band of operation at a particular point in time.

In one embodiment, augmenting and/or assisting of the corresponding game play includes modifying a user interface implemented through the first device in order to make the interaction with the user interface easier or harder to implement. In particular, detection of the differences between the user interfaces used in corresponding platforms allows for augmentation of one or both of the gameplay environments on each of the platforms. For example, if one user is playing console and one is mobile, maybe limit some features on console and provide some shortcuts to mobile user More particularly, a controller input (e.g., gaming input) of the user interface may be modified, wherein the controller input communicates execution of a command for the video game in the first game play. For example, the controller input that is modified may simplify execution of the controller input for the command in the user interface. That is, the communication of the command via the user interface is easier to implement by the user. For instance, when the platform is a mobile phone, the mapped or converted controller input for a command to accelerate an object may be to continually swipe the display screen in an upward direction. As the number of swipes and frequency of swipes increases, the acceleration is also increased. However this may be cumbersome for the player to implement. As such, the augmentation and/or assistance may include a modification of the controller input to include one swipe upwards on the display screen of the mobile phone, and a continual hold of the screen at the end of the swipe. The longer the hold is applied, the greater the acceleration. This modified of the interaction with the user interface makes the video game easier to paly for the user, which would positively affect the valuation of the performance metric measuring gaming effectiveness. Of course, the controller input that is modified may make execution of the controller input more difficult, in other embodiments.

Modification of a user interface may include dynamic tool generation or manipulation. For example, the tool set in a user interface for the video game may be different between the platforms. To make the video game easier to play for one player that is experiencing technical disadvantages, additional tools may be provided in the corresponding user interface to help assist that player. For example, a user interface implemented on a mobile phone may include additional tools. In contrast, to make the video game harder to play for a player that is experiencing technical advantages (i.e., actual or effective realization), tools may be removed from the corresponding user interface that do not allow the player to utilize a full suite of actions in the video game.

In some embodiments, the user interface may be redesigned to accommodate the way the player interacts with the user interface. For example, the player may be left handed and the input controls implemented in the user interface are mostly geared towards a right handed player. In that case, the user interface is modified so that new or modified or replacement input controls are engineered for left-handed players.

In one embodiment, augmenting and/or assisting of the corresponding game play includes modifying the execution of the video game for the first game play to make the video game easier or harder to play. This provides hybrid augmentation and/or assistance that includes a modification to how the video game is played and/or presented to the player. For example, execution may be modified to dynamically add or remove features within the video game to make the game easier or harder to play. This can have a beneficial or positive effect on gaming effectiveness, or can have a negative effect on gaming effectiveness.

For example, modification to the execution of the video game includes making a task or an objective, including one or more tasks, simpler or harder. If the task is simpler to accomplish, then the video game is easier to play and the gaming effectiveness increases. In another example, one or more features of the video game may be removed to make the game simpler or harder to play. In one instance, this may make the game simpler to play, such as when a required feature is now removed from the game play. In that case, the challenged player has an easier time playing the game. For instance, if multiple tasks are required to complete an objective, one or more of those tasks may be removed as a requirement to fulfill the objective (e.g., only need to perform 3 of 5 tasks to achieve a reward). Of course, one or more features of the video game may be added in order to make the game simpler or harder to play.

In another embodiment, augmenting and/or assisting of the corresponding game play includes introducing issues to players that are not handicapped in their gaming effectiveness. For example, one player may experience a reduction in network bandwidth or network QoS, which results in a lowering of their gaming effectiveness. To even the playing field between the players, issues may be introduced in the game play of the player that is not handicapped with a deteriorating network. The issues may include preventing the player from performing a necessary task until a later time, or may remove a feature that is helpful to players (e.g., remove access to online help providing tips).

In still another embodiment, augmenting and/or assisting of the corresponding game play includes modifying the generation of content of the game play for the platform in order to make the video game easier or harder to play. In one example, a player is using a mobile platform via a mobile phone, and the network bandwidth for cloud streaming may be poorer over a mobile network when compared to an internet connection accessed through a home or office. In that case, the content that is generated is optimized for displaying on the mobile phone experiencing network issues. That is, the content is modified to require less processing power for generation of the content. For instance, the content may be limited to include only content that requires less processing so that content is generated quickly and less content is streamed. In another instance, the content that is generated is generated with less resolution. In still another instance, the content that is modified is generated using less processing power, such as when a wide angle view of the gaming environment is changed to present a narrower view, while still ensuring that all relevant content is shown on the mobile device. In still another instance, video display periods may be reduced to favor processing power over display (i.e., give power mostly to processing a frame with higher resolution over multiple frame periods and not to displaying the frame on the mobile phone).

In one embodiment, a notification is provided to a player that indicates the use of game play augmentation and/or assistance for one or more players in a gaming session. For example, the notification may indicate whether the system is currently applying augmentation and/or assistance in his or her game play. In another example, the notification may indicate whether the system is currently applying augmentation and/or assistance in the game play of another player. For example, the notification may be in the form of a visual cue, such as a banner indicating that cross-platform game play assist (i.e., providing augmentation and/or assistance in the game plays of one or more players) on or off for one or more players of a gaming session.

In another embodiment, a player is able to manually begin or terminate augmentation and/or assistance in their game play. For example, the player may not like the use of cross-platform game play assist, and terminates that mode (e.g., sending a termination instruction via the user interface). In another instance, the player may wish to implement augmentation and/or assistance in their game play and begins the cross-platform game play assist mode. In another instance, the turning on or off of the augmentation and/or assistance in a player's game play may be implemented through a menu option, that may be provided in a settings interface of the user's device. The use of the menu option by the player allows the player to know whether the cross-platform game play assist mode is activated or not without the use of a notification or banner. This may be helpful when the player is using a mobile phone which has limited screen space, so that the game play displayed on the screen is not interfered with by the notification (e.g., banner).

Figure 3:
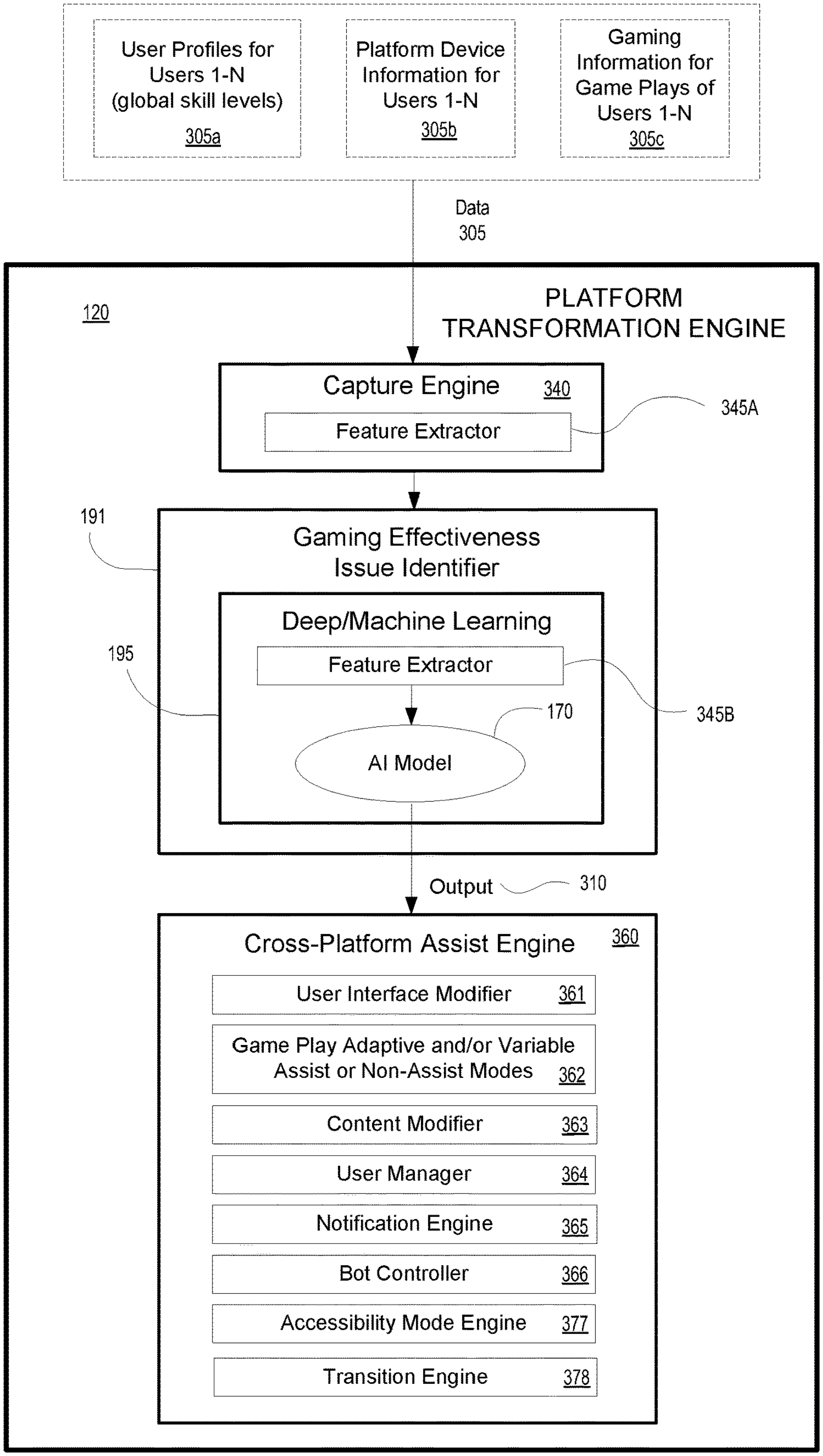
FIG. 3 is an illustration of a system configured to implement an AI model configured for classifying gaming effectiveness in the game plays of a video game of one or more players playing on different platform devices in support of providing cross-platform augmentation and/or assistance in those game plays in order to reduce the effects of playing the video game on different platform devices, in accordance with one embodiment of the present disclosure.

FIG. 3 is an illustration of a system configured to implement an AI model configured for classifying gaming effectiveness in the game plays of a video game of one or more players playing on different platform devices in support of providing cross-platform augmentation and/or assistance in those game plays in order to reduce the effects of playing the video game on different platform devices, in accordance with one embodiment of the present disclosure. For purposes of illustration, the system of FIG. 3 may be implemented by the cloud game network 190 or the client device 110 of FIG. 1, or a combination thereof. Further, the system may be implemented through a third party or mid-level cross-platform transformation engine communicatively coupled through a network.

Data 305 is captured during game plays of one or more players (e.g., participating in a particular gaming session, or one or more gaming sessions), wherein data 305 is related to a game play of one or more players, and includes user profile data 305*a* for one or more players, platform device information 305*b* for the one or more players, and gaming information 305*c* for one or more game plays of corresponding players. In particular, user profile data 305*a* includes information related to each of the players (e.g., identifying information, skill level, etc.). The platform device information 305*b* may include information related to each of the devices used by the players, such as platform, screen size, processing power, etc. The gaming information 305*c* includes user data, user saved data, game state, and various other information, etc. User data may include user identifying information, skill level of the corresponding user, global skill level of the corresponding user, etc. In some cases, user data may be accessed through a corresponding user profile. User saved data personalizes a video game for the corresponding user (e.g., character information and/or attributes used to generate a personalized character, user profile data, etc.), and metadata is configured to provide relational information and/or context for other information, such as game state data 365 (e.g., of a video game that is the interaction application) and the user saved data. For example, the game state may be from a game play of a video game at a particular point in time, or a state of an application during execution, wherein game state data allows for the generation of the gaming environment at the corresponding point in the game play. Also, game state data may include states of devices used for rending the game play (e.g., states of the CPU, GPU, memory, register values, etc.), platform device information (e.g., 305*b*), identification of the executable code to execute the video game at that point, game characters, game objects, object and/or game attributes, graphic overlays, and other information. Also, metadata may include information describing the game context of a particular point in the game play of the user, or the metadata may be used to determine game context, such as where in the game the user is, type of game, mood of the game, rating of game (e.g., maturity level), the number of other players there are in the gaming environment, game dimension displayed, which players are playing a particular gaming session, descriptive information, game title, game title version, franchise, format of game title distribution, downloadable content accessed, links, credits, achievements, awards, trophies, and other information.

Capture engine 340 of the platform transformation engine 120 may be configured to receive data 305 (e.g., through internal and/or external networks) that is relevant to classifying and/or identifying gaming effectiveness for corresponding players, and further identify issues related to the classified gaming effectiveness of the players. As previously described, the received data 305 may include user profile data 305*a*, platform device information 305*b*, and/or gaming information 305*c* (e.g., game state data, user data, user saved data, metadata, etc.), and/or other information.

Data 305 is provided as input into the gaming effectiveness issue identifier 191 that is configured to determine, classify, and/or identify gaming effectiveness of players and their related issues. In particular, capture engine 340 is configured to provide input into the AI model 170 for classification of gaming effectiveness of a corresponding player, and issues related to gaming effectiveness, such as when relative differences in gaming effectiveness between players exceeds a threshold band of operation, as previously described. As such, the capture engine 340 is configured to capture and/or receive as input any data that may be used for classifying gaming effectiveness of players and/or issues related to gaming effectiveness.

Selected portions of data 305 may be analyzed by feature extractor 345A to extract out the salient and/or relevant features useful in classifying and/or identifying gaming effectiveness of players and/or issues related to gaming effectiveness. For example, the feature extractor may be configured to learn and/or define features that are associated with classifying gaming effectiveness of players and/or related issues. In some implementations, feature definition and extraction is performed by the deep/machine learning engine 195, such that feature learning and extraction is performed internally, such as within the feature extractor 345B.

As shown, the deep/machine learning engine 195 is configured for implementation to classify and/or identify classifying gaming effectiveness of players and/or related issues. In one embodiment, the AI model 170 is a machine learning model configured to apply machine learning to classify/identify/predict gaming effectiveness of players and/or related issues. In another embodiment, the AI model is a deep learning model configured to apply deep learning to classify/identify/predict gaming effectiveness of players and/or related issues, wherein machine learning is a sub-class of artificial intelligence, and deep learning is a sub-class of machine learning. In some embodiments, one or more AI models are used to perform customized classification and/or identification of data used for identifying gaming effectiveness and their related issues. For example, different AI models are used to classify and/or identify game context, player effectiveness in gaming, relative differences between player effectiveness in gaming, global skill levels of players, a threshold band of operation based on the global skill levels, when a player experiences a technical advantage and/or disadvantage through comparisons between the relative differences between player effectiveness and the threshold band of operation, etc. These classifications and/or identifications are output by the gaming effectiveness issue identifier 191.

Purely for illustration, the deep/machine learning engine 195 may be configured as a neural network used to implement the AI model 170, that may be configured as one or more AI models, in accordance with one embodiment of the disclosure. Generally, the neural network represents a network of interconnected nodes responding to input (e.g., extracted features) and generating an output, such as those identified above. In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 170.

In particular, the AI model 170 is configured to apply rules defining relationships between features and outputs (e.g., a player's gaming effectiveness when playing a video game, etc.), wherein features may be defined within one or more nodes that are located at one or more hierarchical levels of the AI model 170. The rules link features (as defined by the nodes) between the layers of the hierarchy, such that a given input set of data leads to a particular output (e.g., issue spotting when a player experiences an advantage or disadvantage created through disparate uses of devices of different platforms) of the AI model 170. For example, a rule may link (e.g., using relationship parameters including weights) one or more features or nodes throughout the AI model 170 (e.g., in the hierarchical levels) between an input and an output, such that one or more features make a rule that is learned through training of the AI model 170. That is, each feature may be linked with one or more features at other layers, wherein one or more relationship parameters (e.g., weights) define interconnections between features at other layers of the AI model 170. As such, each rule or set of rules corresponds to a classified output. In that manner, the resulting output 310 according to the rules of the AI model 170 may classify and/or label and/or identify and/or predict gaming effectiveness of players and issues related to gaming effectiveness. For example, the AI model continually receives input data and outputs when relative differences in gaming effectiveness between players exceeds or is within a corresponding threshold band of operation.

Further, the output 310 (e.g., identification of when relative differences in gaming effectiveness between players exceeds a corresponding threshold band of operation) from the AI model 170 may be used to determine a course of action to be taken as determined by the cross platform assist engine 360, as implemented through one or more components. For example, the cross platform assist engine 360 may be configured to determine what the technical advantage or disadvantage is being realized by a player based on the platforms being used by the players, and determine an appropriate action to take that would reduce the realized advantage or disadvantage. In other example, no analysis is performed to determine the advantage or disadvantage, and instead an appropriate action is taken that best brings the gaming effectiveness of the players within the threshold band of operation.

As shown, the cross-platform assist engine 360 may include one or more components configured to perform actions that affect the game play of one or more players in order to level the playing field between the players. For example, the cross-platform assist engine 360 may include a user interface modifier 361, game play adaptive assist mode 362, content modifier 363, user manager 364, notification engine 365, bot controller 366, accessibility mode engine 377, and transition engine 378. Still other components are suitable for performing other actions.

In particular, the cross-platform assist engine 360 includes user interface modifier 361 that is configured to make an interaction with a user interface easier or harder to implement, such as when modifying a controller input of a user interface that is used to communicate a command (e.g., accelerate an object) that is executed by an instance of a video game. Also, the user interface may be modified to add and/or remove tools in order to make the video game easier or harder to play.

Also, the cross-platform assist engine 360 includes the game play adaptive assist mode 362 that further includes adaptive and/or variable assist or non-assist modes, each of which is configured to modify execution of the video game to make the game easier or harder to play. For example, the execution of the video game may be modified to remove features (abilities, tasks to perform, etc.) within the video game. As an illustration, the video game may be made easier to play by removing a requirement to perform a task to accomplish an objective, or may be made harder to play by adding a task to accomplish the objective.

Further, the cross-platform assist engine 360 includes content modifier 363 that is configured to modify generated content. For example, the content may be modified to require less processing for a player that is using a mobile phone platform. For instance, content may be generated with lower resolution to reduce processing, or the field of view may be reduced, or display periods may be lengthened, etc.

The cross-platform assist engine 360 includes user manager 364, which is configured to provide a user the ability to control how the augmentation and/or assistance to the game play is implemented. For example, the user manager 364 provides an interface to allow the user to turn on or off the implementation of augmentation and/or assistance to the game play, or to control degrees of the implementation (e.g., total control or limited control, etc.).

In addition, the cross-platform assist engine 360 includes notification engine 365 which is configured to provide information indicating whether each of one or more players are implementing augmentation and/or assistance to their corresponding game play. For example, a player may not be aware that his or her game play is being augmented and/or assisted without a notification, and based on that information may decide whether or not to continue with the augmentation and/or assistance to the game play. Also, a player may alter how they play a video game based on whether another player in a multi-player gaming session has enabled augmentation and/or assistance to their game play.

Further, the cross-platform assist engine 360 includes a bot controller 366. For example, if a bot is detected, the bot controller 366 can automatically adjust the experience of the bot, such as to lower its effectiveness, in order to achieve an even playing field between a real player and the bot. In another embodiment, the bot controller 366 is configured to take over game play of a player to interact with the bot, in a quasi-simulated game play that controls interactions with the bot.

Also, the cross-platform assist engine 360 includes accessibility mode engine 377 that is configured to optimize the experience of disabled players, such as by enabling improved accessibility to play the video game. In particular, the accessibility mode engine 377 is configured to provided amplified and/or augmented functionality to support accessibility to video gaming for persons with disabilities. For example, the accessibility mode engine 377 may be configured to determine a disability associated with the user. The disability may be discovered through data analysis, active user input identifying the disability, etc. In that manner, augmented functionality may be provided to specifically address that disability. That is, the interaction with the video game may be modified for a player to address accessibility issues. As an illustration, when the disability is a hearing impairment of the player, the video game and/or interaction with the video game may be augmented to allow for an alternative form of communication including changing verbal communication of the video game to a text based communication, etc. As another illustration, when the disability is an inability to use a hand controller, the video game and/or interaction with the video game may be augmented to allow for verbal forms of communicating commands for the player. As such, depending on the disability that is discovered, an appropriate functionality may be provided in order to simplify the gaming experience for the disabled player.

In addition, the cross-platform assist engine 360 includes a transition engine 378. In particular, instead of immediately implementing augmentation and/or assistance to a corresponding game play of a player, the transition engine 378 may gradually change a user interface that has modified an input control associated with communication of a command. That is, the modified input control is gradually phased in or out from the user interface.

Figure 4:
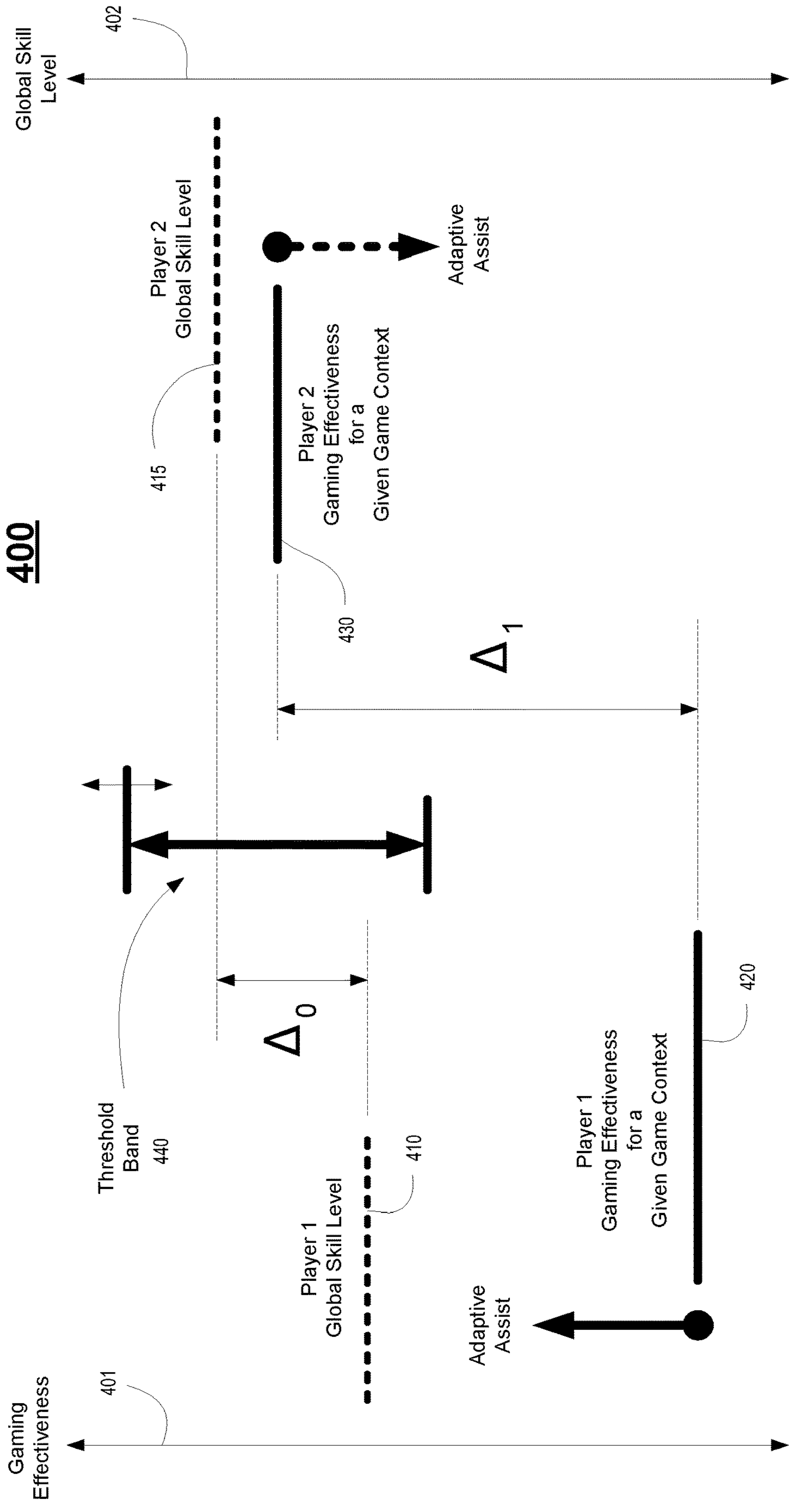
FIG. 4 illustrates an example showing the implementation of adaptive assistance in one or more game plays of a video game of one or more players playing on different platform devices in order to reduce the effects of playing the video game on different platform devices, in accordance with one embodiment of the present disclosure.

FIG. 4 illustrates an example showing the implementation of adaptive assistance in one or more game plays of a video game of one or more players playing on different platform devices in order to reduce the effects of playing the video game on different platform devices, in accordance with one embodiment of the present disclosure.

In particular, FIG. 4 illustrates a chart 400 showing multiple related information. For example, axis 402 illustrates level of global skill of a corresponding player, wherein a global skill level increases moving vertically upwards along axis 402. As such, a global skill level 410 of player 1 and a global skill level 415 of player 2 are shown, wherein the global skill level indicates how well a player can play one or more video games (e.g., highly skilled expert or beginner, etc.). In addition, a relative difference between global skill levels of players 1 and 2 is shown as Δ-0, which demonstrates a base difference between the players' abilities to play the video game that may not be dependent on which platform is being used (e.g., the relative difference is based on average skill levels of the players each playing across many platforms).

Based on the global skill levels 410 and 415, a threshold band of operation 440 can be determined, wherein the threshold band of operation is a function of the global skill levels of the players. In particular, the threshold band of operation 440 is related to the relative difference Δ-0 between global skill levels of the players. As such, the threshold band of operation 440 can be equal to, greater than, or less than the relative difference Δ-0 between global skill levels of the players.

In addition, axis 401 illustrates levels of gaming effectiveness of a corresponding player, wherein gaming effectiveness increases moving vertically upwards along axis 401. As such, gaming effectiveness 420 of player 1 playing a video game for a given game context and gaming effectiveness 430 of player 2 playing the video game for the given game context are shown. As previously described, gaming effectiveness may be an accurate reflection of global skill levels of a corresponding player, as there may be technical advantages or disadvantages that have been introduced. In addition, a relative difference between gaming effectiveness of player 1 and player 2 is shown as Δ-1.

When the relative difference Δ-1 between gaming effectiveness of player 1 and player 2 exceeds the threshold band of operation 440, this may indicate that a player is experiencing a technical advantage or disadvantage over another player. As such, embodiments of the present disclosure is configured to augment and/or assist game plays of one or more players in order to bring the relative difference between gaming effectiveness of player 1 and player 2 within the threshold band of operation 440 in order to level the playing field between the players. For example, the game play of player 1 may be affected to move the gaming effectiveness upwards (as shown by the adaptive assist arrow), and/or the game play of player 2 may be affected to move the gaming effectiveness downwards (as shown by the adaptive assist arrow).

Figure 5:
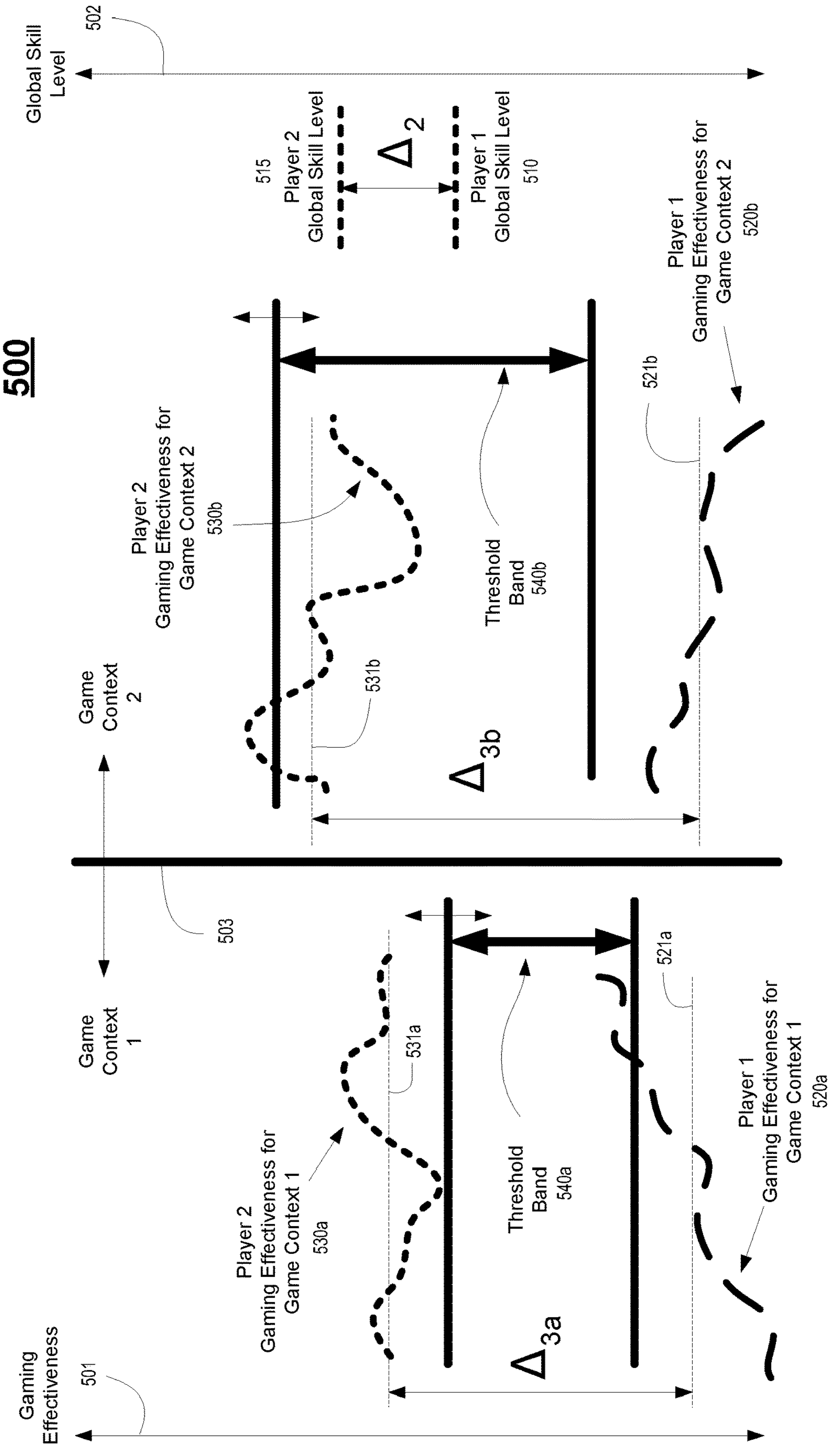
FIG. 5 illustrates the dynamic generation of the threshold band of operation for a given gaming context and the use of the threshold band of operation to provide cross-platform augmentation and/or assistance in the game plays of one or more players playing a video game in order to reduce the effects of playing the video game on different platform devices, in accordance with one embodiment of the present disclosure.

FIG. 5 is a chart 500 illustrating the dynamic generation of the threshold band of operation for a given gaming context and the use of the threshold band of operation to provide cross-platform augmentation and/or assistance in the game plays of one or more players playing a video game in order to reduce the effects of playing the video game on different platform devices, in accordance with one embodiment of the present disclosure. As shown, player 1 and player 2 are participating in a multi-player gaming session across two gaming contexts 1 and 2 separated by line 503.

As shown, axis 502 illustrates a level of global skill of a corresponding player, wherein a global skill level increases moving vertically upwards along axis 502. As such, a global skill level 510 of player 1 and a global skill level 515 of player 2 are shown, wherein the global skill level indicates how well a player can play one or more video games (e.g., highly skilled expert or beginner, etc.). In addition, a relative difference between global skill levels of players 1 and 2 is shown as Δ-2, which demonstrates a base difference between the players' abilities to play the video game that may not be dependent on which platform is being used (e.g., the relative difference is based on average skill levels of the players each playing across many platforms).

Based on the global skill levels 510 and 515, a threshold band of operation can be determined, wherein the threshold band of operation is a function of the global skill levels of the players. The threshold band of operation is dependent on a game context, and is further related to the relative difference Δ-2 between global skill levels of the players. For example, one game context may involve shooting a tank, whereas another game context may involve running through a maze. Depending on the game context, the threshold band of operation may be different. As shown, the threshold band of operation 540*a* associated with game context 1 is smaller than the threshold band of operation 540*b* associated with game context 2.

In addition, axis 501 illustrates levels of gaming effectiveness of a corresponding player, wherein gaming effectiveness increases moving vertically upwards along axis 501. As such, gaming effectiveness 520*a* of player 1 playing a video game and gaming effectiveness 530*a* of player 2 playing the video game are shown for game context 1. Because the gaming effectiveness is dynamically determined, the levels of gaming effectiveness may vary across a period of time. An average level of gaming effectiveness may be determined for each player, including an average gaming effectiveness 521*a* of player 1 and an average gaming effectiveness 531*a* of player 2 for game plays occurring during gaming context 1. A relative difference between average gaming effectiveness of player 1 and player 2 for gaming context 1 is shown as Δ-3a.

Because of the changing gaming contexts, the threshold bands of operation also change, as well as the gaming effectiveness of the players. In particular, gaming effectiveness 520*b* of player 1 playing the video game and gaming effectiveness 530*b* of player 2 playing the video game are shown for game context 2. Because the gaming effectiveness is dynamically determined, the levels of gaming effectiveness may vary across a period of time. An average level of gaming effectiveness may be determined for each player, including an average gaming effectiveness 521*b* of player 1 and an average gaming effectiveness 531*b* of player 2 for game plays occurring during the gaming context 2. A relative difference between average gaming effectiveness of player 1 and player 2 for gaming context 2 is shown as Δ-3b.

Figure 6:
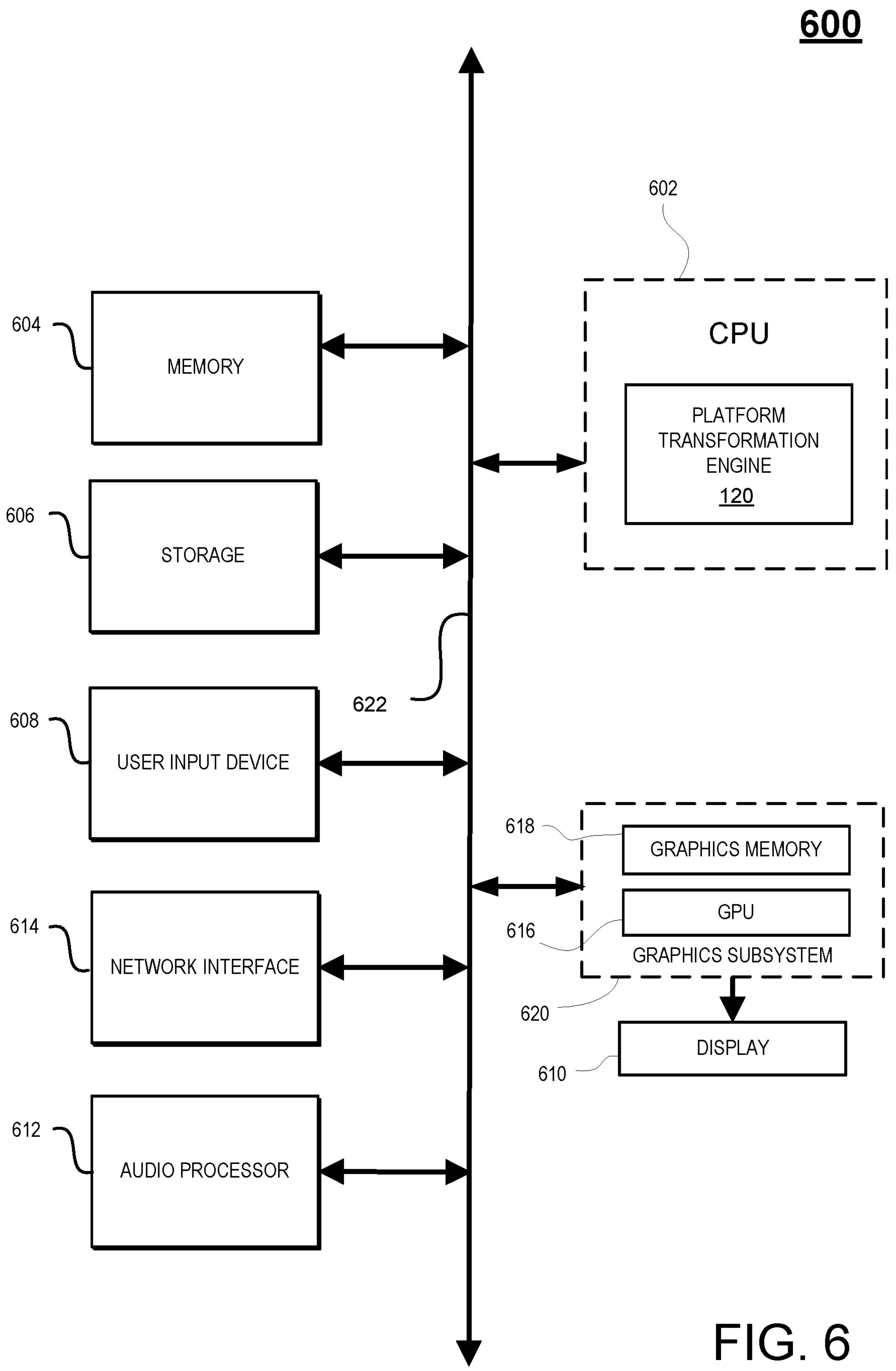
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, and includes a central processing unit (CPU) 602 for running software applications and optionally an operating system. CPU 602 may be comprised of one or more homogeneous or heterogeneous processing cores. Further embodiments can be implemented using one or more CPUs with microprocessor architectures specifically adapted for highly parallel and computationally intensive applications.

In particular, CPU 602 may be configured to implement a platform transformation engine 120 that is configured to provide cross-platform augmentation and/or assistance to one or more players playing a video game on devices of different platforms in a gaming session. The effectiveness of playing a game by a player may be dependent on which platform that player is using. Cross-platform augmentation and/or assistance is designed to reduce and/or remove advantages or disadvantages experienced in a game play of a video game created through cross platform play by players in a gaming session. In that manner, an even playing field between the players playing on devices of different platforms may be achieved.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within an AI engine (e.g., machine learning engine 195) to provide additional processing power, such as for the AI, machine learning functionality, or deep learning functionality, etc.

The graphics subsystem 620 periodically outputs pixel data for an image from graphics memory 618 to be displayed on display device 610. Display device 610 can be any device capable of displaying visual information in response to a signal from the device 600.

In other embodiments, the graphics subsystem 620 includes multiple GPU devices, which are combined to perform graphics processing for a single application that is executing on a CPU. For example, the multiple GPUs can perform alternate forms of frame rendering, including different GPUs rendering different frames and at different times, different GPUs performing different shader operations, having a master GPU perform main rendering and compositing of outputs from slave GPUs performing selected shader functions (e.g., smoke, river, etc.), different GPUs rendering different objects or parts of scene, etc. In the above embodiments and implementations, these operations could be performed in the same frame period (simultaneously in parallel), or in different frame periods (sequentially in parallel).

Accordingly, in various embodiments the present disclosure describes systems and methods configured for providing cross-platform augmentation and/or assistance to one or more players playing a video game on devices of different platforms in a gaming session.

It should be noted, that access services, such as providing access to games of the current embodiments, delivered over a wide geographical area often use cloud computing. Cloud computing is a style of computing in which dynamically scalable and often virtualized resources are provided as a service over the Internet. For example, cloud computing services often provide common applications (e.g., video games) online that are accessed from a web browser, while the software and data are stored on the servers in the cloud.

A game server may be used to perform operations for video game players playing video games over the internet, in some embodiments. In a multiplayer gaming session, a dedicated server application collects data from players and distributes it to other players. The video game may be executed by a distributed game engine including a plurality of processing entities (PEs) acting as nodes, such that each PE executes a functional segment of a given game engine that the video game runs on. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. The PEs may be virtualized by a hypervisor of a particular server, or the PEs may reside on different server units of a data center. Respective processing entities for performing the operations may be a server unit, a virtual machine, or a container, GPU, CPU, depending on the needs of each game engine segment. By distributing the game engine, the game engine is provided with elastic computing properties that are not bound by the capabilities of a physical server unit. Instead, the game engine, when needed, is provisioned with more or fewer compute nodes to meet the demands of the video game.

Users access the remote services with client devices (e.g., PC, mobile phone, etc.), which include at least a CPU, a display and I/O, and are capable of communicating with the game server. It should be appreciated that a given video game may be developed for a specific platform and an associated controller device. However, when such a game is made available via a game cloud system, the user may be accessing the video game with a different controller device, such as when a user accesses a game designed for a gaming console from a personal computer utilizing a keyboard and mouse. In such a scenario, an input parameter configuration defines a mapping from inputs which can be generated by the user's available controller device to inputs which are acceptable for the execution of the video game.

In another example, a user may access the cloud gaming system via a tablet computing device, a touchscreen smartphone, or other touchscreen driven device, where the client device and the controller device are integrated together, with inputs being provided by way of detected touchscreen inputs/gestures. For such a device, the input parameter configuration may define particular touchscreen inputs corresponding to game inputs for the video game (e.g., buttons, directional pad, gestures or swipes, touch motions, etc.).

In some embodiments, the client device serves as a connection point for a controller device. That is, the controller device communicates via a wireless or wired connection with the client device to transmit inputs from the controller device to the client device. The client device may in turn process these inputs and then transmit input data to the cloud game server via a network. For example, these inputs might include captured video or audio from the game environment that may be processed by the client device before sending to the cloud game server. Additionally, inputs from motion detection hardware of the controller might be processed by the client device in conjunction with captured video to detect the position and motion of the controller before sending to the cloud gaming server.

In other embodiments, the controller can itself be a networked device, with the ability to communicate inputs directly via the network to the cloud game server, without being required to communicate such inputs through the client device first, such that input latency can be reduced. For example, inputs whose detection does not depend on any additional hardware or processing apart from the controller itself can be sent directly from the controller to the cloud game server. Such inputs may include button inputs, joystick inputs, embedded motion detection inputs (e.g., accelerometer, magnetometer, gyroscope), etc.

Access to the cloud gaming network by the client device may be achieved through a network implementing one or more communication technologies. In some embodiments, the network may include 5th Generation (5G) wireless network technology including cellular networks serving small geographical cells. Analog signals representing sounds and images are digitized in the client device and transmitted as a stream of bits. 5G wireless devices in a cell communicate by radio waves with a local antenna array and low power automated transceiver. The local antennas are connected with a telephone network and the Internet by high bandwidth optical fiber or wireless backhaul connection. A mobile device crossing between cells is automatically transferred to the new cell. 5G networks are just one communication network, and embodiments of the disclosure may utilize earlier generation communication networks, as well as later generation wired or wireless technologies that come after 5G.

In one embodiment, the various technical examples can be implemented using a virtual environment via a head-mounted display (HMD), which may also be referred to as a virtual reality (VR) headset. As used herein, the term generally refers to user interaction with a virtual space/environment that involves viewing the virtual space through an HMD in a manner that is responsive in real-time to the movements of the HMD (as controlled by the user) to provide the sensation to the user of being in the virtual space or metaverse. An HMD can be worn in a manner similar to glasses, goggles, or a helmet, and is configured to display a video game or other metaverse content to the user. The HMD can provide a very immersive experience in a virtual environment with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures (e.g., commands, communications, pointing and walking toward a particular content item in the scene, etc.). In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network, such as internet, cellular, etc. In one embodiment, the cloud computing and gaming system maintains and executes the video game being played by the user. In some embodiments, the cloud computing and gaming system is configured to receive inputs from the HMD and/or interfacing objectsover the network. The cloud computing and gaming system is configured to process the inputs to affect the game state of the executing video game. The output from the executing video game, such as video data, audio data, and haptic feedback data, is transmitted to the HMD and the interface objects.

Additionally, though implementations in the present disclosure may be described with reference to n HMD, it will be appreciated that in other implementations, non-HMDs may be substituted, such as, portable device screens (e.g., tablet, smartphone, laptop, etc.) or any other type of display that can be configured to render video and/or provide for display of an interactive scene or virtual environment. It should be understood that the various embodiments defined herein may be combined or assembled into specific implementations using the various features disclosed herein. Thus, the examples provided are just some possible examples, without limitation to the various implementations that are possible by combining the various elements to define many more implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein in embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server, or by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator that emulates a processing system.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

monitoring a first game play of a first player playing a video game on a first device of a first platform in a gaming session;

monitoring a second game play of a second player playing the video game on a second device of a second platform in the gaming session;

determining a first valuation of a performance metric for the first game play by the first player, wherein the performance metric is configured to measure gaming effectiveness when playing the video game;

determining a second valuation of the performance metric for the second game play by the second player;

determining that a difference between the first valuation and the second valuation does not satisfy a threshold band of operation for the performance metric that is based on a first global skill level of the first player and a second global skill level of the second player;

detecting a first set of parameters associated with operation of the first device and a second set of parameters associated with operation of the second device, wherein a difference between the first set of parameters and the second set of parameters define at least a part of a gaming environment difference between the first device and the second device; and augmenting the first set of parameters of the first device based on the gaming environment difference to modify the first valuation of the performance metric so that the difference between the first valuation that is modified and the second valuation satisfies the threshold band of operation, wherein satisfying the threshold band of operation normalizes effectiveness of playing the video game between the first player and the second player.

2. The method of claim 1, further comprising:

defining the threshold band of operation as a function of a relative difference between the first global skill level of the first player and the second global skill level of the second player, wherein a global skill level of a player measures overall skill of the player playing one or more video games.

3. The method of claim 1, wherein augmenting the first set of parameters of the first device includes:

modifying a user interface implemented through the first device to modify a controller input of a command used for influencing execution of the video game for the first game play.

4. The method of claim 3, wherein the controller input that is modified simplifies execution of the controller input in the user interface.

5. The method of claim 1, wherein augmenting the first set of parameters of the first device includes:

modifying execution of the video game for the first game play.

6. The method of claim 5, wherein the modifying the execution of the video game includes:

simplifying a task in the video game for the first game play.

7. The method of claim 1, further comprising:

presenting a visual cue on a display of the first device indicating that the first set of parameters of the first device is augmented.

8. The method of claim 1, further comprising: receiving an instruction from the first player via the first device to terminate augmentation of the first set of parameters of the first device.

9. A computer system comprising:
a processor;
memory coupled to the processor and having stored therein instructions that, if executed by the computer system, cause the computer system to execute a method, comprising:
monitoring a first game play of a first player playing a video game on a first device of a first platform in a gaming session;
monitoring a second game play of a second player playing the video game on a second device of a second platform in the gaming session;
determining a first valuation of a performance metric for the first game play by the first player, wherein the performance metric is configured to measure gaming effectiveness when playing the video game;
determining a second valuation of the performance metric for the second game play by the second player;
determining that a difference between the first valuation and the second valuation does not satisfy a threshold band of operation for the performance metric that is based on a first global skill level of the first player and a second global skill level of the second player;
detecting a first set of parameters associated with operation of the first device and a second set of parameters associated with operation of the second device, wherein a difference between the first set of parameters and the second set of parameters define at least a part of a gaming environment difference between the first device and the second device; and
augmenting the first set of parameters of the first device based on the gaming environment difference to modify the first valuation of the performance metric so that the difference between the first valuation that is modified and the second valuation satisfies the threshold band of operation, wherein satisfying the threshold band of operation normalizes effectiveness of playing the video game between the first player and the second player.

10. The computer system of claim 9, the method further comprising:
defining the threshold band of operation as a function of a relative difference between the first global skill level of the first player and the second global skill level of the second player, wherein a global skill level of a player measures overall skill of the player playing one or more video games.

11. The computer system of claim 9, wherein augmenting the first set of parameters of the first device includes:
modifying a user interface implemented through the first device to modify a controller input of a command used for influencing execution of the video game for the first game play.

12. The computer system of claim 11,
wherein the controller input that is modified simplifies execution of the controller input in the user interface.

13. The computer system of claim 9, wherein augmenting the first set of parameters of the first device includes:
modifying execution of the video game for the first game play.

14. The computer system of claim 9, the method further comprising:
presenting a visual cue on a display of the first device indicating that the first set of parameters of the first device is augmented.

15. A non-transitory computer-readable medium storing a computer program for execution by a processor to perform a method, the non-transitory computer-readable medium comprising:
program instructions for monitoring a first game play of a first player playing a video game on a first device of a first platform in a gaming session;
program instructions for monitoring a second game play of a second player playing the video game on a second device of a second platform in the gaming session;
program instructions for determining a first valuation of a performance metric for the first game play by the first player, wherein the performance metric is configured to measure gaming effectiveness when playing the video game;
program instructions for determining a second valuation of the performance metric for the second game play by the second player;
program instructions for determining that a difference between the first valuation and the second valuation does not satisfy a threshold band of operation for the performance metric that is based on a first global skill level of the first player and a second global skill level of the second player;
program instructions for detecting a first set of parameters associated with operation of the first device and a second set of parameters associated with operation of the second device, wherein a difference between the first set of parameters and the second set of parameters define at least a part of a gaming environment difference between the first device and the second device; and
program instructions for augmenting the first set of parameters of the first device based on the gaming environment difference to modify the first valuation of the performance metric so that the difference between the first valuation that is modified and the second valuation satisfies the threshold band of operation, wherein satisfying the threshold band of operation normalizes effectiveness of playing the video game between the first player and the second player.

16. The non-transitory computer-readable medium of claim 15, further comprising:
program instructions for defining the threshold band of operation as a function of a relative difference between the first global skill level of the first player and the second global skill level of the second player,
wherein a global skill level of a player measures overall skill of the player playing one or more video games.

17. The non-transitory computer-readable medium of claim 15, wherein the program instructions for augmenting the first set of parameters of the first device includes:
program instructions for modifying a user interface implemented through the first device to modify a controller input of a command used for influencing execution of the video game for the first game play.

18. The non-transitory computer-readable medium of claim 17,
wherein in the method the controller input that is modified simplifies execution of the controller input in the user interface.

19. The non-transitory computer-readable medium of claim 15, wherein the program instructions for augmenting the first set of parameters of the first device includes:
program instructions for modifying execution of the video game for the first game play.

20. The non-transitory computer-readable medium of claim 15, further comprising:
program instructions for presenting a visual cue on a display of the first device indicating that the first set of parameters of the first device is augmented.

* * * * *